Oct. 11, 1949.  O. W. LIVINGSTON  2,484,575

PHASE CONTROLLED SWITCHING SYSTEM

Filed March 20, 1943  2 Sheets-Sheet 1

Inventor:
Orrin W. Livingston,
by Harry E. Dunham
His Attorney.

Oct. 11, 1949.   O. W. LIVINGSTON   2,484,575
PHASE CONTROLLED SWITCHING SYSTEM
Filed March 20, 1943                    2 Sheets-Sheet 2

Inventor:
Orrin W. Livingston,
by Harry E. Dunham
His Attorney.

Patented Oct. 11, 1949

2,484,575

UNITED STATES PATENT OFFICE 2,484,575

PHASE CONTROLLED SWITCHING SYSTEM

Orrin W. Livingston, Scotia, N. Y., assignor to General Electric Company, a corporation of New York Application March 20, 1943, Serial No. 479,922

15 Claims. (Cl. 323—105)

1

My invention relates to electric control systems and more particularly to automatic control systems of the electronic type for switching phase modifying means such as capacitor equipment for power factor correction in electric transmission and distribution systems.

Power factor correction is often found desirable on transmission lines and distribution circuits to improve voltage regulation, reduce copper losses, and from the point of view of an industrial consumer to reduce power costs where savings may be effected by maintaining an average power factor above a certain percentage.

It is an object of my invention to provide new and improved automatic control means for controlling electric devices.

It is another object of my invention to provide a new and improved automatic control system of the electronic type for controlling reactive current means and thereby varying reactive kilovolt-amperes in a system to maintain the power factor of the system within predetermined limits.

It is a further object of my invention to provide a new and improved arrangement of electronic devices for automatically controlling corrective phase modifying means in an electric system.

My invention will be better understood from the following description taken in connection with the accompanying drawings, and its scope will be pointed out in the appended claims.

Figure 1:
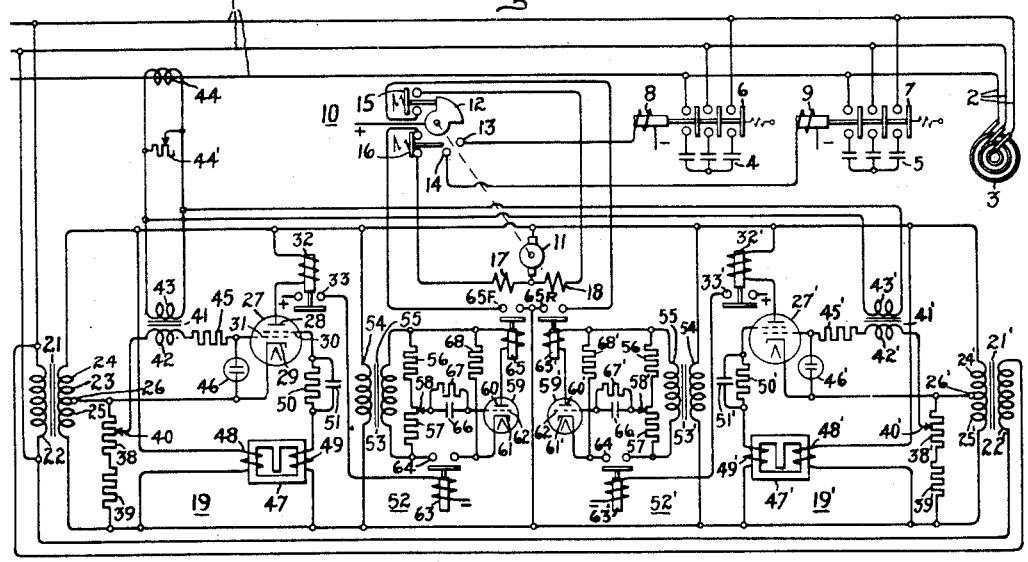
Figure 2:
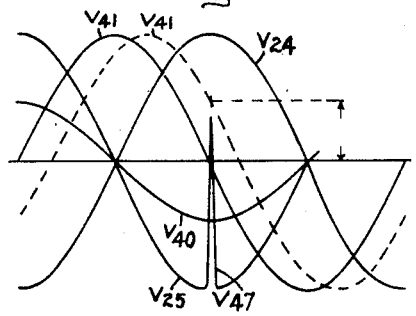
Figure 3:
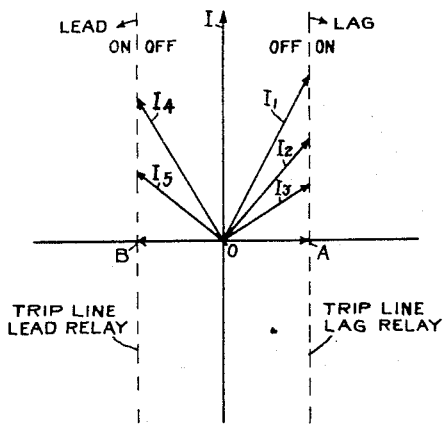
Figure 4:
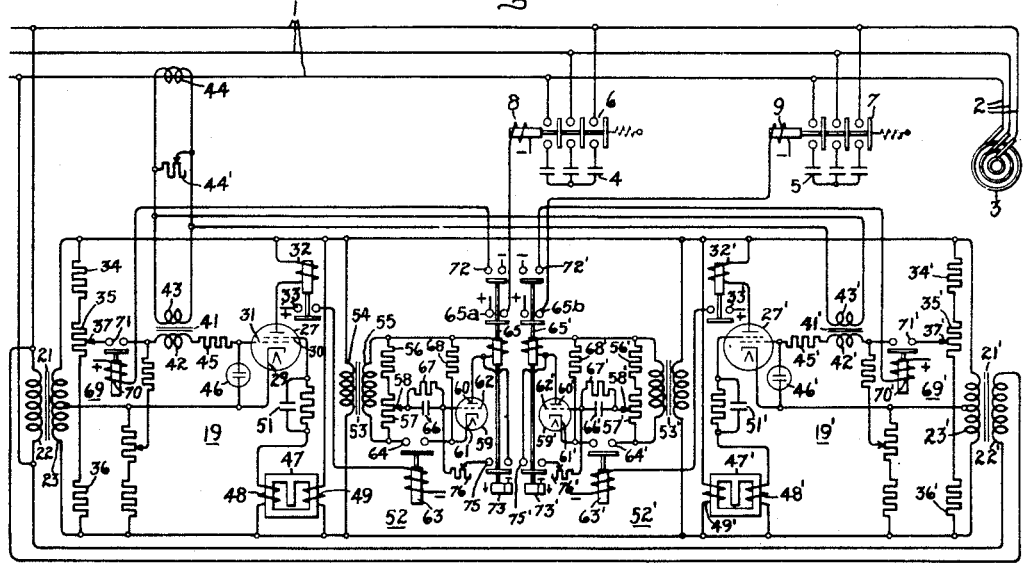
Figure 5:
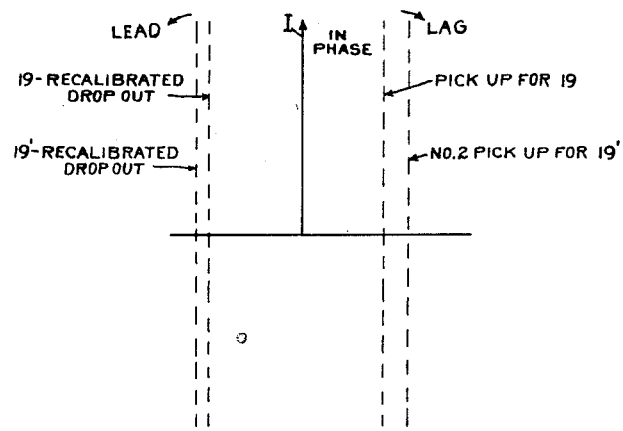

In the drawings, Fig. 1 is a diagrammatic representation of one embodiment of my invention utilizing a motor-operated switching device for controlling the phase modifying means under the control of electronic apparatus responsive to the power factor of a circuit to be controlled; Fig. 2 is a diagram for explaining the operation of the electronic apparatus; Fig. 3 is a further explanatory diagram showing operating features of the electronic apparatus; Fig. 4 is another embodiment of my invention which effects operation without the use of a motor operated switching device; and Fig. 5 is a diagram for explaining the operation of the electronic control apparatus of the embodiment of my invention shown in Fig. 4.

In the drawings, I have shown several embodiments of my invention adapted for use in an electrical system for automatically correcting the power factor of a system by the use of a plurality of capacitors. It will be evident, however, that my invention is not limited to switching capacitors and that any electric device may be switched to and from a system when the electronic control means is properly adjusted in dependence upon the electrical character of the device to be

2 switched, and due regard is had for the nature of the correction to be effected or function to be performed. However, for the purpose of simplifying the disclosure I have directed my description to a system in which a plurality of capacitors are sequentially connected or disconnected from a system in accordance with the operation of two electronic quadrature current relays. The type of relay per se is described in detail and claimed in my copending application, S. N. 479,921 filed concurrently herewith and assigned to the assignee of the present application, now Patent No. 2,404,643, granted July 23, 1946.

Referring to Fig. 1 of the drawings, I have shown an electric distribution system comprising a three-phase alternating current circuit 1, which is connected to supply electric energy to load circuit 2 and which includes as representative of a typical load a dynamo-electric machine 3. It will be presumed that the load circuit 2 draws a variable lagging reactive current and that it is desirable to add compensating leading reactive current when the lagging current of the load exceeds a predetermined value. The corrective leading reactive current means are shown as a plurality of polyphase banks of capacitors comprising two capacitor banks 4 and 5. Although only two capacitor banks are shown it will be evident as the description proceeds that any desired number of capacitor banks may be arranged to be successively connected and disconnected to and from circuit 1. The capacitor banks 4 and 5 are arranged to be connected and disconnected from the circuit 1 by circuit interrupting means 6 and 7, respectively. Circuit interrupting means 6 is provided with an operating coil 8, and circuit interrupting means 7 is provided with an operating coil 9. The coils 8 and 9 are successively energized by means of a switching means 10 operated by a reversible servo-motor 11. The switching means 10 may comprise a conductive switching sector 12 which is mechanically connected to the servo-motor 11 by any suitable connecting and driving means shown by the broken line. The sector 12 is arranged successively to close contact 13 for coil 8 and contact 14 for coil 9 and thereby energize these coils in sequence from the control circuit indicated by the plus and minus symbols. Limit switches 15 and 16 are provided so as to open the forward and reverse control circuits of motor 11 at predetermined operating limits of the switch sector 12. The motor 11 is provided with a pair of reversely connected field coils 17 and 18 which are connected in series relation with the armature of the motor and may be connected, as illustrated, across the alternating current circuit utilized for energizing the electronic control apparatus.

The electronic control apparatus includes electronic reactive current relays 19 and 19'. The electronic control relay 19 may be referred to as the lagging reactive current relay, and the relay 19' may be referred to as the leading reactive current relay. A voltage proportional to the phase voltage of circuit 1 is obtained for energizing the relays 19 and 19' through a transformer 21 comprising a primary winding 22 and a secondary winding 23. In accordance with the particular arrangement illustrated in Fig. 1, primary winding 22 may be connected across the two upper phase conductors of circuit 1. The secondary winding 23 comprises two winding sections 24 and 25 and is provided with a tap 26 of intermediate potential. For effecting the desired response, I provide an electron tube 27, preferably of the gaseous or vapor type, which is provided with an anode 28, a cathode 29, a shield grid 30 and a control grid 31. The anode-cathode circuit of tube 27 is connected to be energized from the secondary winding section 24. The current traversing the anode-cathode circuit of tube 27 is arranged to control the energization of a control means illustrated as an electromagnetic relay provided with an operating coil 32 and contacts 33. An adjustable component of voltage 180 degrees out of phase with the anode voltage of tube 27 is impressed on control electrode 31 which, as illustrated, may be obtained from the secondary winding section 25 by means of a voltage divider comprising resistance elements 38 and 39. Resistance element 38 is provided with an adjustable connection 40 which is connected in circuit with the control electrode 31. In addition, a second component of voltage is introduced into the excitation circuit of control electrode 31 and this component of voltage is arranged to be variable in accordance with the current in an appropriate phase conductor of circuit 1 which, in the case as illustrated, will be the lower phase conductor so that the current will inherently have a 90° relation with the voltage impressed across the anode-cathode circuit of tube 27. This second component of voltage may be introduced, as illustrated, through a transformer 41 having a secondary winding 42 connected in circuit with the control grid 31 and a primary winding 43 connected to be energized from a current transformer 44. For the purpose of adjusting the component of voltage corresponding to the current of line 1 an adjustable resistance 44' may be connected across transformer winding 44. A current limiting resistor 45 may be connected in series relation with the control grid 31, and a voltage limiting and protective glow lamp 46 may be connected between the control grid 31 and the cathode 29.

The shield grid 30 is also energized with two components of voltage, one of which is derived from the secondary section 25 and the other of which is a voltage component of peaked wave form derived from the same phase voltage of circuit 1 as is impressed on the anode-cathode circuit of the tube 27. A suitable means for producing this peaked component of voltage is a peaking transformer 47 comprising a primary winding 48 connected across the secondary winding 23, and a secondary winding 49 connected in series relation with the shield grid 30. With this type of shield grid excitation it may be desirable to provide a small amount of rectified bias which may be obtained by a parallel connected resistor 50 and capacitor 51 in order to insure that the tube 27 will "fire" only at the 90° point and then only if the control grid potential is of the proper magnitude and phase.

For the particular application illustrated, in order to avoid too frequent or unnecessary operation of the motor 11 and the apparatus controlled thereby, it may not be satisfactory to energize the control circuit of the motor 11 immediately upon establishing current flow in the anode-cathode circuit of tube 27. Consequently, a time delay apparatus is interposed between the operation of relay 32 and the energization of the motor control circuit. There are various types of time delay apparatus that would be suitable. A particularly satisfactory time delay apparatus is of the electronic type such as is described and claimed in U. S. Letters Patent No. 2,171,347 of E. D. Schneider granted August 29, 1939 and assigned to the assignee of the present application. In the form as illustrated, I provide a source of voltage from the secondary winding 23 through a suitable transformer 53 comprising a primary winding 54 and a secondary winding 55. A voltage divider comprising two resistance elements 56 and 57 is connected across the secondary winding 55. Resistance 57 is preferably made adjustable and provided with an adjustable contact 58. An electron tube 59 having an anode 60, a cathode 61 and control grid 62 is arranged to be energized from the secondary winding 55. The cathode 61 is connected to one terminal of the transformer secondary through a relay 63 having contacts 64. The operating coil of the relay 63 is connected in a control circuit indicated by the plus and minus signs and is arranged to be energized when the contacts 33 of relay 32 are closed. The anode of tube 59 is connected through an operating winding of relay 65 having contacts 65F to the upper terminal of transformer winding 55. The grid 62 of tube 59 is connected to the adjustable contact 58 through a capacitor 66 and a shunting resistor 67 forming a leakage path through which the capacitor may lose its charge at a predetermined rate. The cathode 61 in addition to its connection to the bottom terminal of secondary winding 55 is also connected to the upper terminal of the same secondary winding through a relatively low resistance 68. The contacts 65F are connected in series relation with the control field winding 17 of motor 11 and are in the open position until tube 59 is energized.

The reactive current electronic control relay 19' is substantially a duplicate of electronic control relay 19 except that the current response is reversed relative to the current response of relay 19 as indicated by the reversal of winding 43', making this relay a leading reactive current relay as contrasted with the lagging reactive current relay 19. Corresponding elements are, therefore, indicated by primed numerals. When tube 27' is energized, it controls the energization of the operating coil of relay 32' so as to close its contacts 33' and thereby close the operating coil of timing relay 52'. The timing relay 52' comprises the tube 59' which when energized causes the energization of the operating coil of relay 65'. The relay 65' is provided with contacts 65R in series relation with the control field winding 18 of motor 11.

The operation of the embodiment of my invention illustrated in Fig. 1 may be more readily understood by reference to Fig. 2 in which the voltage relations in the several electrode circuits of tubes 27 and 27' are illustrated. The anode-cathode voltage of tubes 27 and 27' are represented by a voltage curve $V_{24}$. One component of voltage $V_{25}$ is impressed on shield grid 30 and is obtained from secondary winding section 25 and consequently lags 180° with respect to the voltage $V_{24}$. A peaked component of voltage $V_{47}$ is derived from the peaking transformer 47 and is of the phase and magnitude indicated which is an in-phase relation with the anode-cathode voltage. The rectified bias from capacitor 51 insures that tube 27 "fires" at the 90° point of the anode-cathode voltage wave if the control grid is energized sufficiently to effect firing.

The resultant potential of control grid 31 is the sum of the 180° out-of-phase component of voltage between secondary intermediate tap 26 and the adjustable tap 40 on resistor 38 and is indicated as $V_{40}$, and the component of voltage $V_{41}$ derived from the line current transformer 44 through transformer 41. For the purpose of measuring reactive amperes, the particular voltage and current chosen from the polyphase circuit 1 affords the 90° relation between the voltage and current components. Therefore, the sum of the curves $V_{40}$ and $V_{41}$ illustrates this component of voltage under unity power factor conditions. It will be seen that the resultant grid potential at the 90° point, which is the only point at which conduction may be initiated in tube 27, is negative since it is equal to the instantaneous sum of $V_{40}$ and $V_{41}$. The tube 27, therefore, remains nonconductive. If the phase of the line current of circuit 1 becomes lagging, the phase of $V_{41}$ becomes correspondingly lagging until a point is reached as shown by the dashed curve $V_{41}$ where due to a combination of phase shift and magnitude of current the instantaneous control voltage becomes more positive than the critical grid voltage at the same time the peak excitation is on shield grid 30. Under this condition, tube 27 fires, conducting current for half the positive anode voltage cycle. It will be seen that the instantaneous value of the voltage component $V_{41}$ corresponding to the current of circuit 1 at the 90° point is proportional to $I \sin \delta$. This expression is also the value of lagging reactive amperes so that when this voltage component reaches a predetermined value or preset value sufficient to overcome the adjustable component of $V_{40}$ it indicates that a certain lagging reactive current is flowing.

The same general operation also applies to the reactive current electronic relay 19' except that tube 27' becomes conductive at the 90° point of the anode-cathode wave when a certain leading reactive current is flowing.

The vector diagram of Fig. 3 shows this operation diagrammatically. The central vertical axis indicated by I may be taken to represent the unity power factor axis, and the vectors $I_1$, $I_2$, $I_3$, $I_4$ and $I_5$ are current vectors displaced in phase from the unity power factor axis. It will be noted that although $I_1$, $I_2$ and $I_3$ are of different absolute magnitudes, their lagging component $I_{OA}$ on the horizontal axis is the same and just sufficient to trip the lagging current relay 19. Similarly, the vectors $I_4$ and $I_5$ represent leading current conditions in which the current is of different absolute magnitudes but in which the leading component is $I_{OB}$. Hence, if the leading current has a component equal to or greater than $I_{OB}$, the leading reactive relay 19' will function and cause energization of the control relay 32'.

The general operation of the system illustrated in Fig. 1 is substantially as follows. The electronic relay 19 is set for a definite lagging current value and the electronic relay 19' is set for a definite leading current value. If the quadrature current is somewhere between these two limits as indicated by AB in Fig. 3, neither relay is energized and the equipment remains in the state as illustrated. If the quadrature component of line current becomes greater in the lagging direction than the setting of the lagging current relay 19, relay 32 is energized to close its contacts 33 and thereby energize the relay 63 of timing relay 52. If the lagging current condition is of only short duration, the relay 32 may re-open its contacts 33 and thereby reset the time delay relay 52 without any further operation. However, if the lagging current condition persists on circuit 1, the relay 65 of the timing relay 52 will become energized after the preset time interval and the contact 65F of servo-motor 11 will be closed to cause operation of the switching sector 12 slowly in a clockwise direction which may be referred to as the forward direction. This movement of sector 12 closes the contact 13 which in turn closes the control circuit indicated by the plus and minus signs for the operating coil 8 of circuit breaker 6 to cause the capacitor bank 4 to be connected across circuit 1. If the addition of capacitor bank 4 is not sufficient to bring the power factor of circuit 1 back to the predetermined condition, the tube 27 remains energized and likewise the servo-motor remains energized and continues to move sector 12 further in the forward direction to close contact 14 which, in turn, energizes the control coil 9 of circuit interrupter 7 and thereby connects capacitor bank 5 across circuit 1. As soon as sufficient capacitance has been added to reduce the quadrature current below the trip value of the lagging relay 19, this relay opens its contacts. This, in turn, deenergizes timing relay 52 which stops the motor driven switch and prevents further capacitor sections from being added. As shown in this embodiment of my invention, there are only two capacitor banks shown, but it will be apparent to those skilled in the art that any number of capacitor banks may be employed and closed successively as above indicated. In any event, at the limit of movement of sector 12 the limit switch 16 is operated to interrupt the servo-motor circuit when the last capacitor bank of the plurality of banks has been added.

If at any time the leading quadrature current exceeds the setting of the leading current relay 19', the tube 27' becomes energized to energize relay 32' so as to energize time delay relay 52' and thereby close contact 65R in the control circuit of servo-motor 11 and cause reverse operation of this motor. When motor 11 operates in the reverse direction, contact 14 is first interrupted to cause circuit interrupter 7 to disconnect capacitor 5 from circuit 1. If the leading component is still above the predetermined value, tube 27' continues to be energized and the motor continues to rotate in a counter-clockwise direction and interrupt the contact 13, thereby deenergizing coil 8 and disconnecting capacitor bank 4 from circuit 1. The motor 11 is caused to come to rest either by the deenergization of tube 27' of relay 19' or by the sector 12 being operated to its extreme limit so as to open limit switch 15.

In Fig. 4 I have shown another embodiment of my invention utilizing the electronic quadrature relays 19 and 19' for progressively switching the capacitor banks 4 and 5 to and from circuit 1 without using the motor-driven master sequence switch 10 as shown in Fig. 1. Elements corresponding to those of Fig. 1 are assigned like reference numerals. In this case, relays 19 and 19' are both arranged to operate as quadrature lagging relays and each relay is set with "pick-up" and "drop-out" points appreciably separated. Each relay is also provided with a recalibrating arrangement which comprises the recalibrating relays 69 and 69' respectively. A resistance network or voltage divider comprising three resistance elements 34, 35 and 36, is connected across the secondary winding 23 of transformer 21. An adjustable connection 37 is provided on resistance 35 and is connected to control grid 31. The relay 69 is provided with an operating coil 70 and contacts 71 which are connected in series relation between the adjustable connection 37 and the secondary winding 42 of current transformer 41. Similarly, relay 69' is provided with an operating coil 70' and contacts 71' which are interposed in series relation between the adjustable connection 37' and the secondary winding 42' of current transformer 41'. The operating coil 70 of the recalibrating relay 69 is arranged to be energized from a control bus indicated by the plus and minus signs through auxiliary contacts 72 which are arranged to be closed when the relay 65 is in the closed position. Similarly, operating coil 70' of recalibrating relay 69' is arranged to be energized from the control bus through the contacts 72' which are arranged to be closed when relay 65' is in its closed position. This arrangement also differs from that shown in Fig. 1 by the provision of time delay opening means 73 and 73' on the timing relays 65 and 65'. In order to make the time delay opening means 73 effective, it is desirable to interlock the relay 65 with the timing relay 52 so that if the reactive current relay 19 should drop out during the time delay dropout period of 73 and again pick up before relay 65 drops out, relay 65 could be maintained in its energized position without going through its timing cycle. A satisfactory interlocking arrangement is to provide interlocking contacts 75 on relay 65 and connect these contacts in series with a relatively low resistance 76 connected between the grid 62 and anode 60 of the time relay tube 59. This arrangement in effect shunts the timing capacitor 66 so that so long as relay 65 is in its energized or picked up position, the tube 59 will conduct current without time delay at any time during such interval that relay 32, and hence relay 63, is moved to the closed position.

In Fig. 5, I have shown an operating diagram for the arrangement illustrated in Fig. 4 wherein the central vertical vector I represents an in-phase condition of the current of circuit 1, and the two parallel and vertical dotted lines to the right represent the "pick-up" lines for relays 19 and 19', respectively, for current in the lagging direction. Similarly, the two vertical dotted lines to the left represent the recalibrated "drop-out" limits for current in the leading direction of relays 19 and 19', respectively. It will be noted that the "pick-up" and "drop-out" points of relay 19 are set slightly lower than that of relay 19'. In addition, the time delay relay 52 associated with relay 19 is set for a slightly shorter time delay than relay 52' associated with relay 19'.

The operation of the system illustrated in Fig. 4 is substantially as follows. As the lagging current from system 1 is slowly increased, the relay 19 becomes energized or "picks up" by the closure of relay 32 which in turn picks up relay 63 of time delay relay 52. If the assumed condition persists long enough time delay relay 52 will "time-out" and pick up relay 65. The energization of relay 65 closes its contacts 65a and energizes operating coil 8 of circuit breaker 6 so as to connect capacitor bank 4 to circuit 1. At the same time, the auxiliary switch contacts 72 on relay 65 are closed to energize coil 70 of the recalibrating relay 69 and thereby change the grid potential on control grid 31 of tube 27 so as to establish a new "drop-out" limit, as shown by the first vertical dotted line to the left of the central current axis of Fig. 5. If the lagging reactive component of current continues to increase, the relay 19' becomes energized and after a time delay, as determined by the time delay relay 53', relay 65' is energized to close the energizing circuit for operating coil 9 of circuit interrupter 7 and thereby connect capacitor bank 5 to circuit 1. Upon closure of circuit interrupter 7, auxiliary contacts 72' are closed to energize coil 70' of recalibrating relay 69' so that relay 19' has a new "drop-out" value of reactive current as indicated by the second vertical dotted line to the left of the central current axis in Fig. 5. The reverse action under decreasing lagging or increasing leading quadrature current will, of course, cause a reverse sequence of operation in a manner which it is believed will be obvious.

If the lagging current increases very rapidly, it is possible to cause both relays 19 and 19' to pick up simultaneously, but if time delay relay 52 operates in a shorter time than time delay relay 52', operating coil 8 will be energized first and if the correction provided is sufficient relay 19' will be restored to its deenergized condition without closure of contacts 65b of time delay relay 52'. In fact, it is not actually essential that the tripping points of relays 19 and 19' differ at all if the time delay relays 52 and 52' have different times of operation.

It will be evident that this system may be extended if desired to any number of capacitor banks, but since one reactive current relay and one time delay relay per section are required, the motor driven master sequence switching arrangement of Fig. 1 may be cheaper for installations involving a large number of capacitor banks. It should also be noted that in either system the current limits in the lead and lag direction must be separated sufficiently with respect to the current drawn by a single capacitor bank so that the addition or subtraction of a single capacitor bank does not throw the equipment from one limit to the other.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In combination, an alternating current circuit, an electric device, switching means for controlling the operation of said device, an electronic relay comprising an electron tube provided with anode-cathode and control electrode circuits, means for energizing the respective circuits of said tube in accordance with two coexisting electrical quantities of said alternating current circuit, additional means for energizing said control electrode circuit so that said tube may be rendered conductive only at the same predetermined point in each successive half cycle of its anode-cathode voltage, means responsive to a plurality of different predetermined relations between said electrical quantities for rendering said tube conductive at the same predetermined point in each successive half cycle of anode-cathode voltage, and means operative in accordance with the conductivity of said tube for controlling said switching means.

2. In combination, an alternating current circuit, an electric device, switching means for selectively connecting and disconnecting said electric device to and from said alternating current circuit, an electronic relay comprising an electron tube provided with anode-cathode and control electrode circuits, means for energizing the respective circuits of said tube in accordance with two coexisting electrical quantities of said alternating current circuit, means for energizing said control electrode circuit so that said tube may be rendered conductive only at one point in each half-cycle of its anode-cathode voltage, means responsive to a predetermined relation between said electrical quantities for rendering said tube conductive, means operative in accordance with the conductivity of said tube for controlling said switching means, time delay means interposed between said last mentioned means and said switching means, and means for interrupting the timing action of said time delay means when said tube is rendered non-conductive before the timing action of said time delay means is completed.

3. In a system of distribution wherein a switch is interposed between an alternating current circuit and an electric device, means for controlling said switch comprising switch controlling means and a reactive current electronic relay including an electron tube provided with anode-cathode and control electrode circuits, means for energizing the anode-cathode circuit of said tube in accordance with an alternating voltage of said alternating current circuit, means for introducing in said control electrode circuit components of voltage varying respectively in accordance with the voltage and current of said alternating current circuit, means for producing a voltage of peaked wave form, means for energizing said control electrode circuit in accordance with the voltage component of peaked wave form from said last mentioned means so that said tube may be rendered conductive only at a predetermined point in each half-cycle of anode-cathode voltage, means operable in accordance with a predetermined phase relation between the current and voltage of said alternating circuit for rendering said tube conductive, and means connected in circuit with said tube and arranged to be energized when said tube is conductive for controlling said switch controlling means.

4. In a system of distribution wherein a switch is interposed between an alternating current circuit and an electric device, means for controlling said switch comprising switch controlling means and a quadrature current relay including an electron tube provided with anode-cathode and control electrode circuits, means for energizing the anode-cathode circuit of said tube with an alternating voltage of said alternating current circuit, means for introducing in said control electrode circuit current and voltage components of voltage varying respectively in accordance with the current and voltage of said alternating current circuit, means for adjusting the phase of said current component of voltage so that it leads the anode-cathode voltage of said tube by ninety degrees when the power factor of said alternating current circuit is unity, means for adjusting the magnitude of said voltage component of voltage, means for producing a voltage of peaked wave form, means for energizing said control electrode circuit with the voltage of peaked wave form from said last mentioned means at the ninety degree point in each half cycle of anode-cathode voltage so that said tube may be rendered conductive at said ninety degree point when said current component of voltage departs a predetermined amount from its ninety degree leading position, and control means connected in circuit with said tube and arranged to be energized when said tube is conductive for controlling said switch controlling means.

5. In combination, an alternating current circuit, an electric device, switching means for connecting and disconnecting said electric device to and from said circuit, an electronic relay comprising an electron tube provided with anode-cathode and control electrode circuits, means for energizing the respective circuits of said tube in accordance with two coexisting electrical quantities of said alternating current circuit, means responsive to a predetermined relation between said electrical quantities for rendering said tube conductive, relay switching means operative in accordance with the conductivity of said tube for controlling said first mentioned switching means, a source of alternating voltage, and auxiliary contact means arranged for operation by said relay switching means in correspondence with the connecting and disconnecting operation of said first-mentioned switching means for connecting and disconnecting said source of alternating voltage to and from said control electrode circuit.

6. In a system of distribution wherein a switch is interposed between an alternating current circuit and an electric device, means for controlling said switch comprising switch controlling means and a reactive current electronic relay including an electron tube provided with anode-cathode and control electrode circuits, means for energizing the anode-cathode circuit of said tube in accordance with an alternating voltage of said alternating current circuit, means for introducing in said control electrode circuit components of voltage varying respectively in accordance with the voltage and current of said alternating current circuit, means for producing a voltage of peaked wave form, means for energizing said control electrode circuit in accordance with the voltage of peaked wave form from said last mentioned means so that said tube may be rendered conductive only at a predetermined point in each half-cycle of anode-cathode voltage, means operable in accordance with a predetermined phase relation between the current and voltage of said alternating circuit for rendering said tube conductive, means connected in circuit with said tube and arranged to be energized when said tube is conductive for causing operation of said switch controlling means, and means operative in response to the operation of said switch controlling means for changing the energization of said control electrode circuit so that said tube may remain conductive for a different predetermined phase relation than said predetermined phase relation.

7. In a system of distribution wherein a switch is interposed between an alternating current circuit and an electric device, means for controlling said switch comprising switch controlling means and a quadrature current relay including an electron tube provided with anode-cathode and control electrode circuits, means for deriving from said alternating current circuit components of voltage varying respectively in accordance with the current and voltage of said circuit, means for impressing said components of voltage in said control electrode circuit for causing conduction of said tube when the lagging reactive component of the current of said alternating current circuit exceeds a predetermined value, means connected in circuit with said tube for operating said switch controlling means upon conduction of said tube, and means effective upon operation of said switch controlling means for modifying one of the components of voltage in said control electrode circuit to maintain said tube conductive for a value of reactive component of current less than said predetermined value.

8. In combination, an alternating current circuit, an electric device, switching means for selectively connecting and disconnecting said electric device to and from said alternating current circuit, an electronic relay comprising an electron tube provided with an anode-cathode circuit connected to be energized from said alternating current circuit and a control electrode circuit, means responsive to two coexisting electrical quantities of said alternating circuit and connected to energize said control electrode circuit for rendering said tube conductive for a predetermined relation between said electrical quantities, circuit control means operative in accordance with the conductivity of said tube for controlling said switching means, time delay means interposed between said circuit control means and said switching means for delaying the operation of said switching means to its circuit closing condition, means for delaying the operation of said switching means to its circuit opening condition, and interlocking means arranged in operative relation with said circuit control means for rendering said time delay means inoperative to introduce time delay during the time delay period of said last mentioned means.

9. In combination, an alternating current circuit, switching means having a circuit opening and circuit closing condition in operative relation with said alternating current circuit, circuit control means responsive to an electrical condition of said alternating current circuit for operating said switching means, an electronic timing means comprising an electron tube provided with an anode-cathode circuit and a control electrode and interposed between said switching means and said circuit control means, means responsive to the energization of said circuit control means for completing the anode-cathode circuit of said tube, means connected to the control electrode circuit for delaying the initiation of the conduction of said tube a predetermined interval of time after said anode-cathode circuit is completed, means for delaying the operation of said switching means to its circuit opening condition, and means operated in response to the operation of said switching means to its circuit closing condition for modifying the energization of said control electrode to render said tube conductive without delay during the period of the circuit opening delay of said switching means.

10. In a system of distribution wherein switching means is interposed between an alternating current circuit and a plurality of electric devices to be selectively connected to and disconnected from the alternating current circuit, means for controlling said switching means comprising a plurality of control circuits and a rotatable switching member in said control circuits, a reversible servo-motor for operating said switching member and being provided with a forward excitation circuit for operating said switching member in a direction to close said control circuits and a reverse excitation circuit for operating said switching member in a direction to open said control circuits, a lagging quadrature current electronic relay operable in accordance with the lagging quadrature current of said alternating current circuit for causing energization of said forward excitation circuit when the component of lagging quadrature current of said alternating current circuit exceeds a predetermined value, time delay means interposed between said relay and said forward excitation circuit, a leading quadrature current electronic relay operable in accordance with the leading quadrature current of said alternating current circuit for causing energization of said reverse excitation circuit when the component of leading quadrature current of said alternating current circuit exceeds a predetermined value, and time delay means interposed between said leading current relay and said reverse excitation circuit.

11. In a system of distribution wherein switching means is interposed between an alternating current circuit and a plurality of electric devices to be selectively connected to and disconnected from the alternating current circuit, means for controlling said switching means comprising a plurality of control circuits each having a switching member therein for opening and closing its associated control circuit, a plurality of relays operable in accordance with an electrical quantity of said alternating current circuit and arranged one with each switching member for controlling the energization of its associated control circuit, said relays each having an energized "pick-up" value to cause one operation of said switching member and a deenergized "drop-out" value to cause a different operation of said switching member, and means for adjusting the "pick-up" and "drop-out" values of each relay to cause progressive operation of said switching members.

12. In a system of distribution wherein a separate switch is interposed between an alternating current circuit and each of a pair of electric devices to be selectively connected to and disconnected from the alternating current circuit, means for controlling said switches comprising a first control circuit and a first switch member therein for controlling the opening and closing of the control circuit for one of said switches and a second control circuit and a second switch member therein for controlling the opening and closing of the control circuit for the other of said switches, a first lagging quadrature current electronic relay for operating said first switch member, means for adjusting said electronic relay to "pick up" at a predetermined lagging component of the current of said alternating current circuit and to "drop out" at a predetermined leading component of current, said first switch member being arranged to close its control circuit when said relay "picks up" and to open its control circuit when said relay "drops out," a second lagging quadrature current electronic relay for operating said second switch member, and means for adjusting said second electronic relay to "pick up" at a higher predetermined lagging component of current than said first electronic relay and to "drop out" at a higher leading component of current than said first electronic relay, said second switch member being arranged to close its control circuit when said second relay "picks up" and to open its control circuit when said second relay "drops out."

13. In a system of distribution wherein a separate switch is interposed between an alternating current circuit and each of a pair of electric devices to be selectively connected to and disconnected from the alternating current circuit, means for controlling said switches comprising a first control circuit and a first switch member therein for controlling the opening and closing of the control circuit for one of said switches and a second control circuit and a second switch member therein for controlling the opening and closing of the control circuit for the other of said switches, a first electronic relay for operating said first switch member, said electronic relay comprising an electron tube provided with a control electrode, an operating coil in circuit with said tube for causing said first switch member to close when said tube is rendered conductive and to open when said tube is rendered non-conductive, means responsive to a predetermined lagging component of current of said alternating current circuit for energizing said control electrode to cause said tube to become conductive, means operative in response to the closing operation of said first switch member for modifying the potential of said control electrode to cause said relay to become non-conductive at a predetermined leading component of current of said alternating current circuit, a second electronic relay for operating said second switch member, said second relay comprising an electron tube provided with a control electrode, an operating coil in circuit with the tube of said second relay for causing said second switch member to close when its associated tube is rendered conductive, means responsive to a lagging component of current greater than said predetermined lagging component of current for energizing the control electrode and effect conduction of the tube of said second relay, and means operative in response to the closing of said second switch member for causing the tube of said second relay to become non-conductive at a leading component of current greater than said predetermined leading component of current.

14. In a system of distribution wherein a separate switch is interposed between an alternating current circuit and each of a pair of electric devices to be selectively connected to and disconnected from the alternating current circuit, means for controlling said switches comprising a first control circuit and a first switch member therein for controlling the opening and closing of the control circuit for one of said switches and a second control circuit and a second switch member therein for controlling the opening and closing of the control circuit for the other of said switches, a first electronic relay operable in accordance with a predetermined lagging reactive component of current of said alternating current circuit for effecting energization of said first control circuit, time delay means interposed between said first relay and said first control circuit and being adjusted to provide a predetermined time interval between the energization of said first relay and the energization of its associated control circuit, a second electronic relay operable in accordance with the same predetermined lagging reactive component of current of said circuit for effecting energization of said second control circuit, and time delay means interposed between said second relay and said second control circuit and being adjusted to provide a greater time interval than the time interval of said first relay between the energization of said second relay and the energization of its associated control circuit.

15. In a system of distribution wherein a separate switch is interposed between an alternating current circuit and each of a pair of electric devices to be selectively connected to and disconnected from the alternating current circuit, means for controlling said switches comprising a first control circuit and a first switch member therein for controlling the opening and closing of the control circuit for one of said switches and a second control circuit and a second switch member therein for controlling the opening and closing of the control circuit for the other of said switches, a first electronic relay operable in accordance with a predetermined lagging reactive component of current of said alternating current circuit for effecting the energization of said first control circuit, time delay means interposed between said first relay and said first control circuit, means operative in response to the closure of said first switch member for recalibrating said first relay so as to maintain said control circuit energized for a leading reactive component of current below a predetermined value, a second electronic relay responsive to a lagging component of current greater than said predetermined value of said first relay for effecting the energization of said second control circuit, time delay means interposed between said second relay and said second control circuit and having a longer time delay than the time delay means associated with said first relay, and means operative in response to the closure of said second switch member for recalibrating said second relay so as to maintain said control circuits energized for a leading reactive component of current greater than said predetermined value of leading reactive component of current of said first relay.

ORRIN W. LIVINGSTON.

REFERENCES CITED

The following references are of record in the file of this patent:

UNITED STATES PATENTS

| Number | Name | Date |
|---|---|---|
| Re. 19,896 | Alexanderson | Mar. 24, 1936 |
| 2,056,769 | Buchting | Oct. 6, 1936 |
| 2,104,690 | Bedford | Jan. 4, 1938 |
| 2,173,921 | Stansbury | Sep. 26, 1939 |
| 2,227,285 | Stansbury | Dec. 31, 1940 |
| 2,243,584 | Toda | May 27, 1941 |
| 2,279,229 | Evans | Apr. 7, 1942 |
| 2,295,388 | Cuttino | Sept. 8, 1942 |
| 2,298,026 | Bany | Oct. 6, 1942 |